United States Patent [19]
Wada et al.

[11] Patent Number: 5,910,046
[45] Date of Patent: Jun. 8, 1999

[54] COMPETITION GAME APPARATUS

[75] Inventors: Tetsuya Wada, Kakogawa; Toru Mizumoto, Takatsuki, both of Japan

[73] Assignee: Konami Co., Ltd., Hyogo-ken, Japan

[21] Appl. No.: 08/790,694

[22] Filed: Jan. 29, 1997

[30] Foreign Application Priority Data

Jan. 31, 1996 [JP] Japan .................................. 8-035686

[51] Int. Cl.⁶ .............................. A63F 9/14; G09B 9/04
[52] U.S. Cl. .................................. 463/6; 434/69; 434/65; 364/411.1; 340/323 R
[58] Field of Search .............................. 463/1, 6, 23, 25, 463/30–32, 40–42, 36; 434/61–62, 64, 65, 69, 307 R, 308; 364/410.1, 411.1; 273/148 B, DIG. 26; 340/323 R

[56] References Cited

U.S. PATENT DOCUMENTS

| 5,269,687 | 12/1993 | Mott et al. | 463/6 |
| 5,354,202 | 10/1994 | Moncrief et al. | 434/65 |
| 5,366,376 | 11/1994 | Copperman et al. | 273/148 B |
| 5,368,484 | 11/1994 | Copperman et al. | 273/148 B |

OTHER PUBLICATIONS

Patent Abstracts Of Japan, vol. 095, No. 011, Dec. 26, 1995 & JP 07 204354 A (Namco Ltd), Aug. 8, 1995.
Patent Abstracts Of Japan, vol. 018, No. 525 (C–1257), Oct. 5, 1994 & JP 06 182053 A (Sega Enterp Ltd), Jul. 5, 1994.
Patent Abstracts Of Japan, vol. 096, No. 005, May 31, 1996 & JP 08 000831 A (Namco Ltd), Jan. 9, 1996.
Patent Abstracts Of Japan, vol. 018, No. 058 (C–1159), Jan. 31, 1994 & JP 05 277257 A (Konami KK), Oct. 26, 1993.
Patent Abstracts Of Japan, vol. 018, No. 630 (P–1835), Nov. 30, 1994 & JP 06 242720 A (Sega Enterp Ltd), Sep. 2, 1994.

*Primary Examiner*—Jessica J. Harrison
*Assistant Examiner*—Mark A Sager
*Attorney, Agent, or Firm*—Jordan and Hamburg LLP

[57] ABSTRACT

An image display processor displays a real-time three-dimensional image including a player's automobile, a plurality of general automobiles, and a course established in a game space on a display monitor. A driving control assembly is operated by a player to instruct the player's automobile to run on the course. A player's automobile control unit controls the player's automobile to run on the course in response to instructions from the driving control assembly. A rank decision unit ranks the player's automobile using a parameter relative to a skill of the player while the player's automobile is running on the course. The rank decision unit detects whether the player's automobile passes or is passed by one of the general automobiles, and varies the value of the parameter based on the detection of the player's automobile passing or being passed by one of the general automobiles.

22 Claims, 9 Drawing Sheets

COURSE COORDINATE SYSTEM

COMPETITION GAME APPARATUS

BACKGROUND OF THE INVENTION

1. Field of the Invention

The present invention relates to a competition game apparatus such as a driving game apparatus which can be operated by the player to control an automobile driven in a simulated manner or actually by the player to compete for ranking with another automobile driven in a simulated manner or actually by another player or a computer.

2. Description of the Prior Art

There has heretofore been known a driving game apparatus as a competition game apparatus operated by a plurality of players to run a plurality of automobiles driven in a simulated manner respectively by the players on respective courses or tracks that are virtually established in a game space, in order to complete for ranking after a predetermined period of time has elapsed or the automobiles have traveled a predetermined distance. There has also been known a competition game apparatus in an amusement park or the like which is operated by a plurality of players to drive respective movable amusement objects actually on respective courses or tracks in order to complete for ranking after a predetermined period of time has elapsed or the movable amusement objects have traveled a predetermined distance.

In the above competition game apparatus, however, the automobiles or movable amusement objects are ranked solely based on their positions after a predetermined period of time has elapsed or the automobiles or the movable amusement objects have traveled a predetermined distance, and their ranking does not properly reflect the driving skill of each of the players. Specifically, the driving skill of each player which can be evaluated includes the ability, which has been evaluated by conventional competition game apparatus, to run fast on a given course or track, and other elements, e.g., the ability to pass many closely running automobiles without contacting or colliding with the, and the ability to run fast along a given curve. Since the conventional competition game apparatus have evaluated only part of the driving skill of the player, they fail to properly evaluate other aspects of the driving skill of the player, e.g., the ability to pass other automobiles. Therefore, the conventional competition game apparatus may not be interesting to those players who have excellent ability to drive their automobiles or movable amusement objects to pass other automobiles or movable amusement objects in the competition game.

SUMMARY OF THE INVENTION

It is therefore an object of the present invention to provide a competition game apparatus which is capable of evaluating many different aspects of the driving skill of the player thereby to allow the player to play a competition game with much interest.

According to the present invention, there is provided a competition game apparatus comprising image display processing means for displaying a real-time image including a player's movable object, a plurality of other movable objects, and a course established in a game space on a display monitor, driving control means operable by a player for instructing the player's movable object to run on the course, player's movable object control means for controlling the player's movable object to run on the course in response to instructions from the driving control means, and ranking means for ranking the player's movable object using a parameter relative to a skill of the player while the player's movable object is running on the course.

The movable objects may include a movable object controlled by a player other than the player who controls the player's movable object, or a movable object controlled by the competition game apparatus according to a predetermined process. These movable objects which are controlled by the other player and the competition game apparatus may be present at the same time among the movable objects.

The parameter is of such a nature that can evaluate the skill of the player while the player's movable object is running on the course. The value of the parameter may vary as the player's movable object passes or is passed by one of the other movable objects, as described below, or may vary depending on the highest speed of the player's movable object on the course, may vary depending on the speed of the player's movable object at a given point on the course, may vary depending on the number of times that the player's movable object contacts or collides with another movable object or a course boundary. The parameter may vary according to a plurality of factors.

The ranking means may store large parameter values acquired by ten players in upper ranks or parameter values acquired by players and greater than a predetermined parameter value, and the stored parameter values may be displayed together with the names or initials of the players in a demonstration image. The ranking means may rank the player's movable object also based on its ranking among all the movable objects after a predetermined period of time has elapsed or the player's movable object has traveled a predetermined distance.

Since the player's movable object is ranked using the parameter relative to the skill of the player while the player's movable object is running on the course, the skill of the player is evaluated in various ways rather than only the rank after a predetermined period of time has elapsed or the player's movable object has traveled a predetermined distance, as is the case with the conventional competition game apparatus.

The ranking means comprises passing detecting means for detecting whether the player's movable object passes or is passed by one of the other movable objects, and parameter varying means for varying the value of the parameter based on a detected signal from the passing detecting means.

The passing detecting means detects a passing action between the player's movable object and the other movable objects. Such a passing action may be detected by detecting the instant one of the player's movable object and one of the other movable objects passes the other. Specifically, the instant one of the player's movable object and one of the other movable objects passes the other is detected as follows: The distances which are traveled by the player's movable object and the other movable objects are detected at all times, and the other movable objects are classified into a group of movable objects positioned in front of the player's movable object and a group of movable objects positioned behind the player's movable object. When one of the other movable objects enters one of the groups, i.e., has moved forward or backward of the player's movable object, a passing action is detected. Alternatively, the speeds of other movable objects around the player's movable object are detected at all times in addition to the distances, and the instant of a passing action may predicted based on the difference in speed between the player's movable object and one of the other movable objects.

The parameter varying means varies the value of the parameter based on a passing action detected by the passing detecting means. The parameter varying means may vary the value of the parameter depending on the distance between the players movable object and one of the other movable objects when the players movable object passes the one of the other movable objects, or may vary the value of the parameter depending on the distance between the players movable object and a course boundary, or may increase or decrease the value of the parameter each time the detected signal is inputted from the passing detecting means.

Since a passing action between the players movable object and one of the other movable objects is detected by the passing detecting means, and the parameter varying means varies the value of the parameter based on a detected signal from the passing detecting means, the ranking means ranks the players movable object based on the skill of the player with respect to the passing action thereof.

The passing detecting means comprises first distance calculating means for calculating a distance between the player's movable object and the one of the other movable objects when the detected signal is outputted from the passing detecting means, and the parameter varying means comprises means for varying the value of the parameter based on the distance calculated by the first distance calculating means.

The first distance calculating means calculates a distance between the player's movable object and the one of the other movable objects upon a passing action therebetween. The first distance calculating means may calculate a two-dimensional distance between the player's movable object and the one of the other movable objects or a distance therebetween in the transverse or longitudinal direction of the course.

The parameter varying means may vary the value of the parameter by increasing the value of the parameter as the distance calculated by the first distance calculating means is reduced, or by increasing the value of the parameter stepwise depending on the calculated distance. While the value of the parameter may be increased in proportional to the calculated distance, it is preferable to increase the value of the parameter in inverse proportion to the calculated distance from the standpoint of evaluating the skill of the player because the skill of the player is considered higher with respect to passing actions as the distance between the player's movable object and the one of the other movable objects is smaller upon passing actions.

Inasmuch as the distance between the player's movable object and the one of the other movable objects is calculated by the first distance calculating means upon a passing action therebetween, and the parameter varying means varies the value of the parameter depending on the distance calculated by the first distance calculating means, the ranking means ranks the player's movable object using the distance between the player's movable object and the one of the other movable objects upon the passing action.

The course has a predetermined width defined by course boundaries, and the passing detecting means comprises second distance calculating means for calculating a distance between the player's movable object and one of the course boundaries when the detected signal is outputted from the passing detecting means, and the parameter varying means comprises means for varying the value of the parameter based on the distance calculated by the second distance calculating means.

The second distance calculating means calculates a distance between the player's movable object and one of the course boundaries upon a passing action therebetween. The second distance calculating means may calculate a two-dimensional distance between the player's movable object and a course boundary or a distance therebetween in the transverse direction of the course.

The parameter varying means may vary the value of the parameter by increasing the value of the parameter as the distance calculated by the second distance calculating means is reduced, or by increasing the value of the parameter stepwise depending on the calculated distance. While the value of the parameter may be increased in proportional to the calculated distance, it is preferable to increase the value of the parameter in inverse proportion to the calculated distance from the standpoint of evaluating the skill of the player because the skill of the player is considered higher with respect to passing actions as the distance between the player's movable object and the course boundary is smaller upon passing actions.

Inasmuch as the distance between the player's movable object and the course boundary is calculated by the second distance calculating means upon a passing action therebetween, and the parameter varying means varies the value of the parameter depending on the distance calculated by the second distance calculating means, the ranking means ranks the player's movable object using the distance between the player's movable object and the course boundary upon the passing action.

The parameter varying means comprises means for varying the value of the parameter based on the number of times that the detected signal is outputted from the passing detecting means.

The parameter varying means may vary the value of the parameter by either increasing the value of the parameter by a predetermined increment each time a passing action is detected or changing (preferably increasing) such an increment as the number of passing actions is increased.

Because the parameter varying means varies the value of the parameter each time a passing action between the player's movable object and one of the other movable objects is detected, the ranking means ranks the player's movable object based on the number of passing actions performed by the players.

The other movable objects include controlled movable objects, and the ranking means comprises passing detecting means for detecting whether the player's movable object passes or is passed by one of the controlled movable objects, and parameter varying means for varying the value of the parameter based on a detected signal from the passing detecting means.

If the movable objects which are controlled by the other player and the competition game apparatus are present at the same time among the movable objects, then a passing action between one of those movable objects and the player's movable object is detected. Accordingly, the value of the parameter is varied with respect to the movable object which is preferably evaluated as an object to which the passing action is directed by the player. The skill of the player can thus be evaluated in a manner to make the driving game interesting to the player.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
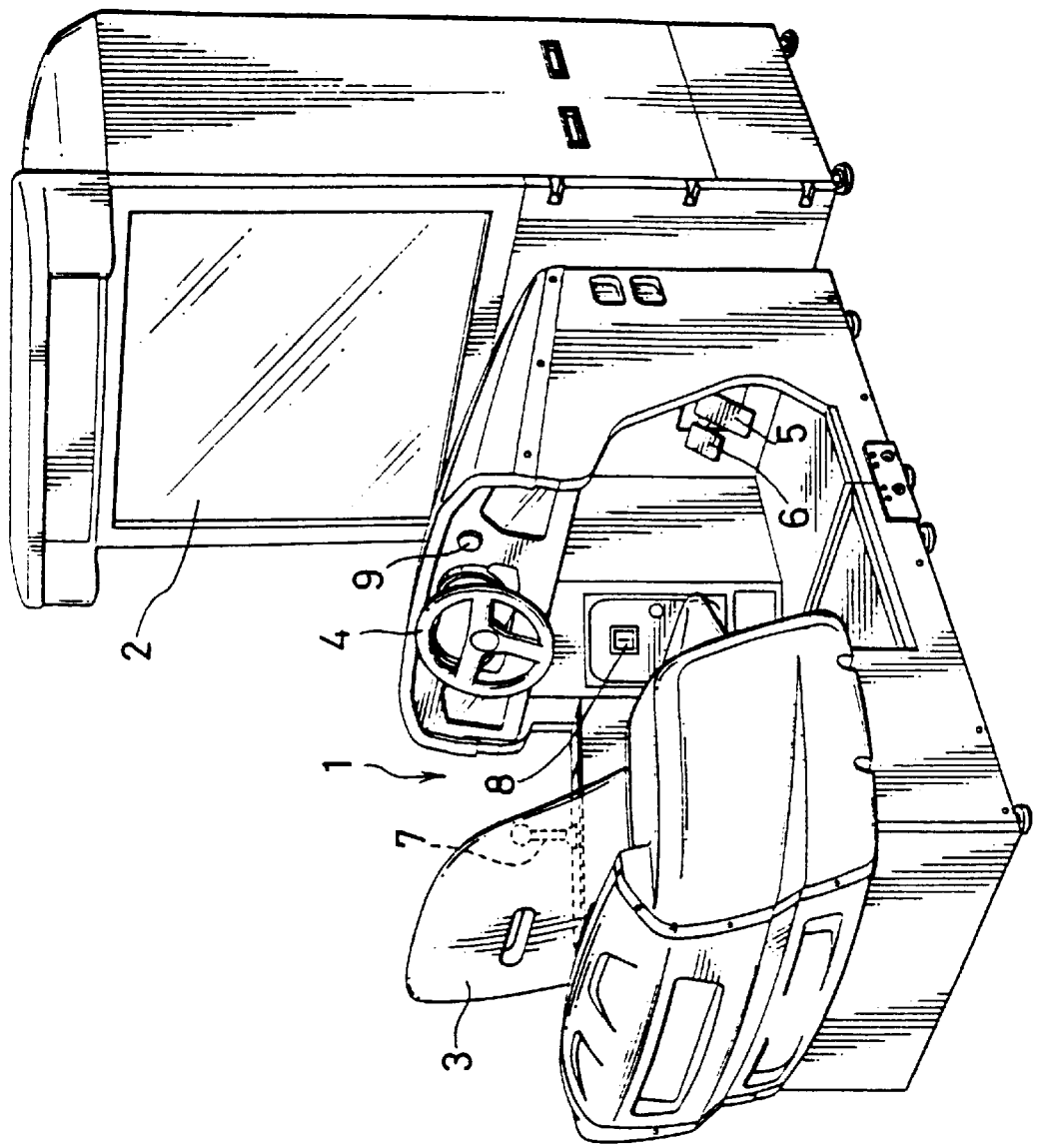
FIG. 1 is a perspective view of a driving game machine according to the present invention.

As shown in FIG. 1, a driving game machine as a competition game apparatus according to the present invention generally comprises a cockpit 1 and a display monitor 2. The cockpit 1 has a driver's seat 3, a steering wheel 4, an accelerator pedal 5, a brake pedal 6, and a gear change lever 7, similar to the driver's seat of an actual automobile. The cockpit 1 also has a coin insertion slot 8 for inserting a coin therethrough, positioned in front of the left-hand side of the driver's seat 3, and a start switch 9 positioned on the right-hand side of the steering wheel 4. The display monitor 2 is located in front of the cockpit 1 at a position that can easily be viewed by the player who is seated on the driver's seat 3. The display monitor 2 may comprise a CRT (cathode-ray tube), an LCD (liquid crystal display), a projector, or the like for displaying images thereon.

Coordinate systems used in an image processing process for a driving game played on the driving game machine and a summary of such a driving game will be described below with reference to FIGS. 2 through 4.

Figure 2:
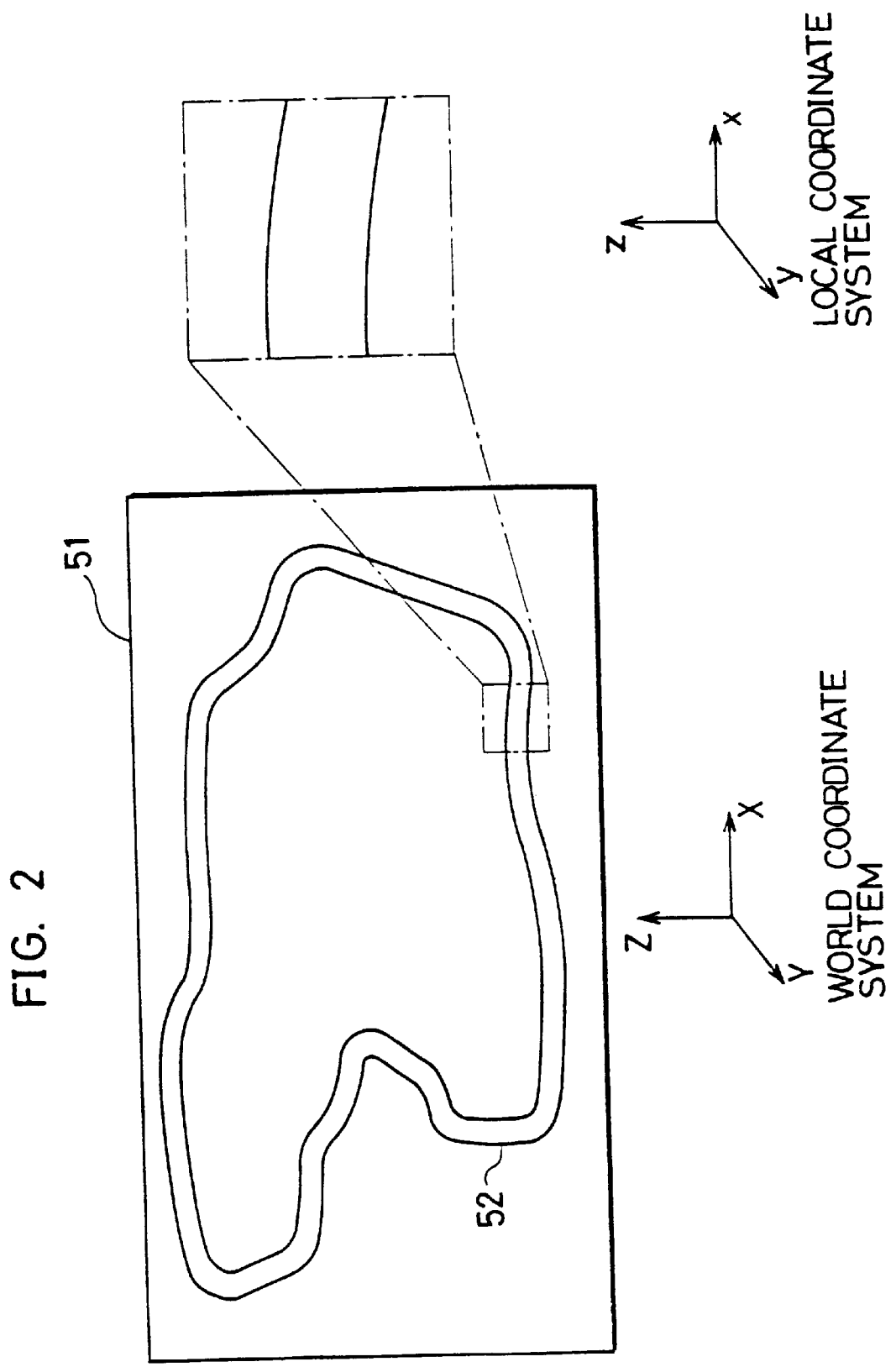
FIG. 2 is a diagram showing a field of a driving game played on the driving game machine.

FIG. 2 schematically shows a field 51 of a driving game played on the driving game machine. The field 51 shown in FIG. 2 represents an entire space that is expressed by a computer graphic image, and includes a circuit road 52 extending substantially along peripheral edges of the field 51 and models (not shown) of buildings and other objects placed along the circuit road 52. FIG. 3 fragmentarily shows the circuit road 52. As shown in FIG. 3, the circuit road 12 has a start point and is divided into road models ①, ②, ③, ④, ⑤, ⑥ spaced by respective distances from the start point. Each of the road models ①, ②, ③, ④, ⑤, ⑥ is an individual object that is displayed as a computer graphic image.

FIG. 2 also shows a three-dimensional world coordinate system (X, Y, Z) which is established in the field 51 in its entirety, and a three-dimensional local coordinate system (x, y, z) which is established in a partial space in the field 51. Each of the road models ①, ②, ③, ④, ⑤, ⑥ and the models of buildings and other objects is described using its own inherent local coordinate system (x, y, z).

Figure 4:
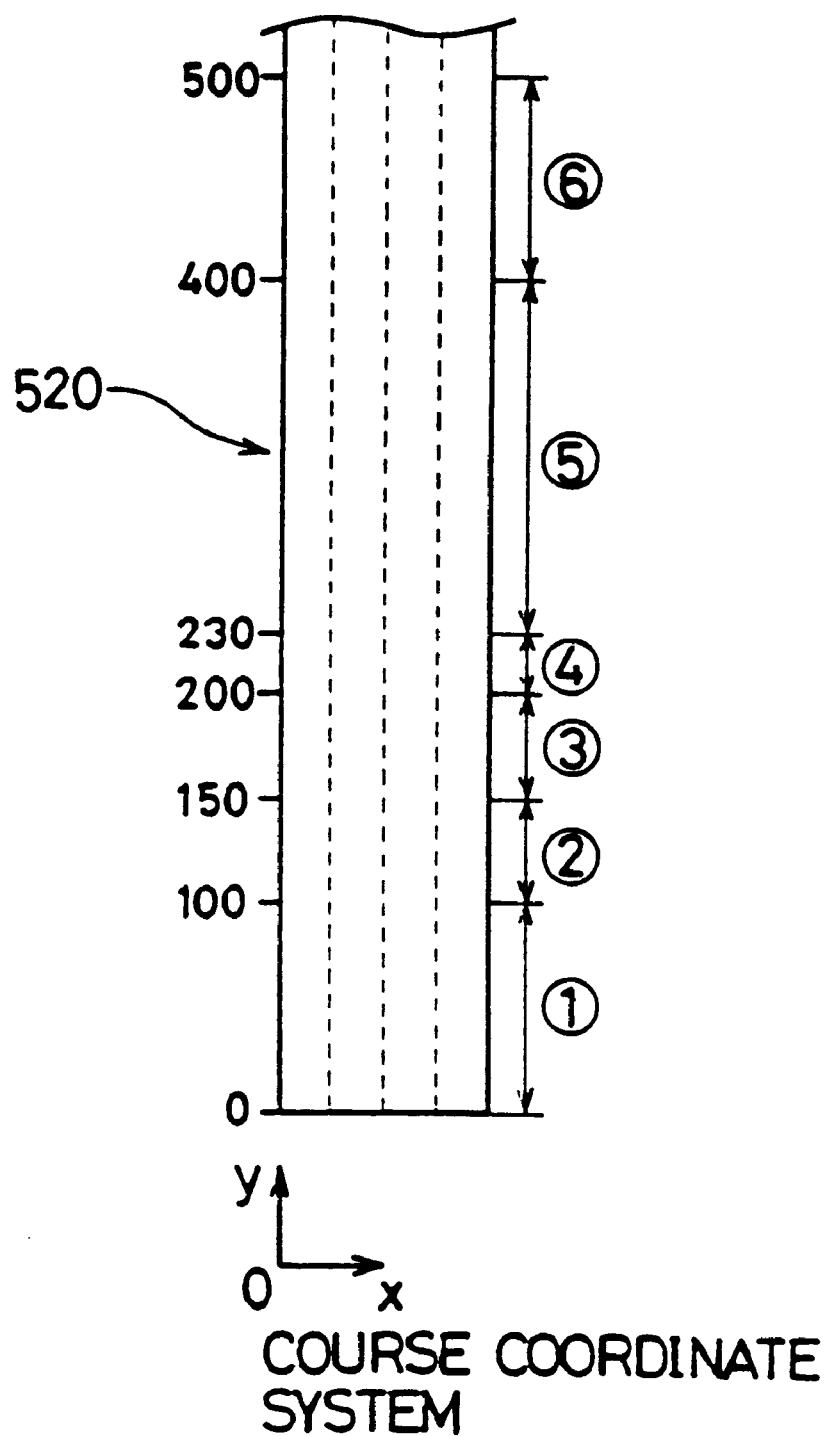
FIG. 4 is a diagram showing a hypothetical straight road that is converted from the circuit road along a center line thereof.

FIG. 4 illustrates a hypothetical straight road 520 that is converted from the circuit road 52 along a center line thereof. A two-dimensional course coordinate system (x, y) shown in FIG. 4 is established on the straight road 520. The two-dimensional course coordinate system (x, y) has y coordinates which represent distances along the straight road 520 from the start point, and x coordinates which represent transverse positions across the straight road 520. As shown in FIG. 4, the straight road 520, i.e., the circuit road 52, has four lanes.

In a driving game played on the driving game machine by the player sitting in the cockpit 1, the player controls the steering wheel 4, the accelerator pedal 5, the brake pedal 6, and the gear change lever 7, trying to drive the player's automobile displayed on the display monitor 2 while passing general automobiles and rival automobiles displayed on the display monitor 2, on the circuit road 52. The general automobiles and the rival automobiles running on the circuit road 52 are controlled by the driving game machine. There are several tens of general automobiles and several (e.g., five) rival automobiles established by the driving game machine and identifiable by inherent codes assigned respectively thereto. The driving game progresses as the player's automobile competes for ranking with the rival automobiles after a predetermined period of time has elapsed (hereinafter referred to as "timeout") from starting of the player's automobile or after the player's automobile has traveled a predetermined distance (hereinafter referred to as "goal"). Depending on the position and direction of the player's automobile, the models of buildings and other objects along the circuit road 52 and the general automobiles, which are positioned within a visible range, are displayed on the display monitor 2.

Figure 5:
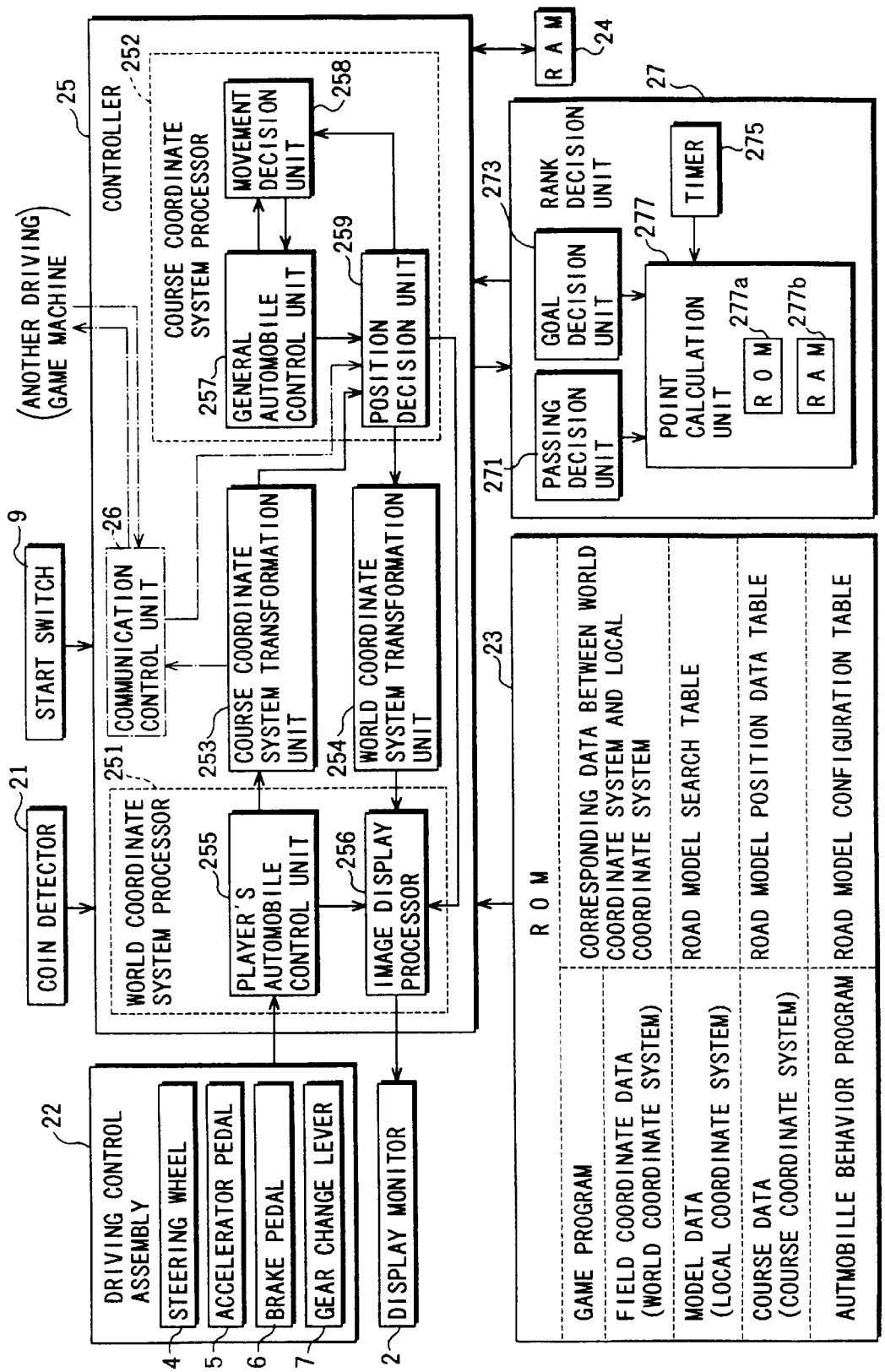
FIG. 5 is a block diagram of a control system of the driving game machine.

FIG. 5 shows in block form a control system of the driving game machine according to the present invention.

As shown in FIG. 5, the control system basically comprises the display monitor 2, the start switch 9, a coin detector 21, a driving control assembly 22, a ROM (read-only memory) 23, a RAM (read-only memory) 24, a controller 25, and a ranking decision unit 27.

When the start switch 9 is pressed by the player, the start switch 9 issues a switch signal to the controller 25. When the coin detector 21 detects a coin inserted through the coin insertion slot 8, it outputs a coin-detected signal to the controller 25.

The driving control assembly 22 comprises the steering wheel 4, the accelerator pedal 5, the brake pedal 6, and the gear change lever 7. The driving control assembly 22 supplies various control data, representing an angular displacement of the steering wheel 4, depths to which the accelerator pedal 5 and the brake pedal 6 are depressed, and a gear position selected by the gear change lever 7, to the controller 25 where they are inputted to a player's automobile control unit 255 (described later on).

The ROM 23 stores a program of the driving game, coordinate data of the field in the world coordinate system (X, Y, Z), coordinate data of the models in the local coordinate system (x, y, z), course data in the course coordinate system (x, y), a program relative to automobile behaviors according to the automobile engineering, data indicative of the correspondence between the world coordinate system (X, Y, Z) and the local coordinate system (x, y, z), and table data shown in Tables 1 through 3, described below. The RAM 24 serves to temporarily store various data.

The controller 25 comprises a CPU (central processing unit), logic circuits, and other circuit elements for controlling operation of the driving game machine. The controller 25 determines whether a coin is inserted into the coin insertion slot 8 or not based on the signal from the coin detector 21, and also determines whether the start switch 9 is pressed by the player or not based on the signal from the start switch 9.

The controller 25 has a world coordinate system processor 251, a course coordinate system processor 252, a course coordinate system transformation unit 253, and a world coordinate system transformation unit 254.

The world coordinate system processor 251, which carries out control in the world coordinate system (X, Y, Z), has a player's automobile control unit 255 and an image display processor 256. The course coordinate system processor 252, which carries out control in the local coordinate system (x, y, z), has a general automobile control unit 257, a movement decision unit 258, and a position decision unit 259.

The player's automobile control unit 255 controls the running of the player's automobile based on the various control data supplied from the driving control assembly 22 according to the program, stored in the ROM 23, relative to automobile behaviors according to the automobile engineering. The course coordinate system transformation unit 253 transforms the coordinate data relative to the position of the player's automobile that is being controlled in the world coordinate system (X, Y, Z) into coordinate data in the course coordinate system (x, y).

The general automobile control unit 257 controls the running of general automobiles on the straight road 520 (see FIG. 4) in the course coordinate system (x, y) under preset conditions with respect to speeds, lane change frequencies, etc.

Since y coordinates in the course coordinate system (x, y) represent distances traveled by the general automobiles along the straight road 520, the general automobile control unit 257 can easily determine the positions of the general automobiles simply by adding the product of (sampling interval)×(running speed) to the present y coordinates. Since x coordinates in the course coordinate system (x, y) represent positions of the general automobiles transversely across the straight road 520, the general automobile control unit 257 can easily determine transverse displacements of the general automobiles due to a lane change, for example, simply by adding or subtracting the product of (sampling interval)×(moving speed transversely across the straight road 520) to or from the present y coordinates.

The position decision unit 259 determines the positional relation between the player's automobile and the general and rival automobiles for a contact, a collision, etc., and the positional relation between the general and rival automobiles, and also determines general and rival automobiles which are positioned in a predetermined visible range of the player's automobile, on the straight road 520 in the course coordinate system (x, y). The position decision unit 259 additionally determines the positional relation between the player's automobile and a road boundary (displayed as a wall image of the road) for a contact, a collision, etc. on the straight road 520 in the course coordinate system (x, y). The position decision unit 259 uses the coordinate data transformed by the course coordinate system transformation unit 253 as the positional coordinate data of the player's automobile. The predetermined visible range of the player's automobile has been defined by left and right angles with respect to the direction in which the player's automobile travels, and a distance from the player's automobile.

When the position decision unit 259 determines a contact or collision between the player's automobile and a general or rival automobile or between the player's automobile and a road boundary, it delivers a collision signal to the image display processor 256 and a passing decision unit 273 (described later on).

Figure 6:
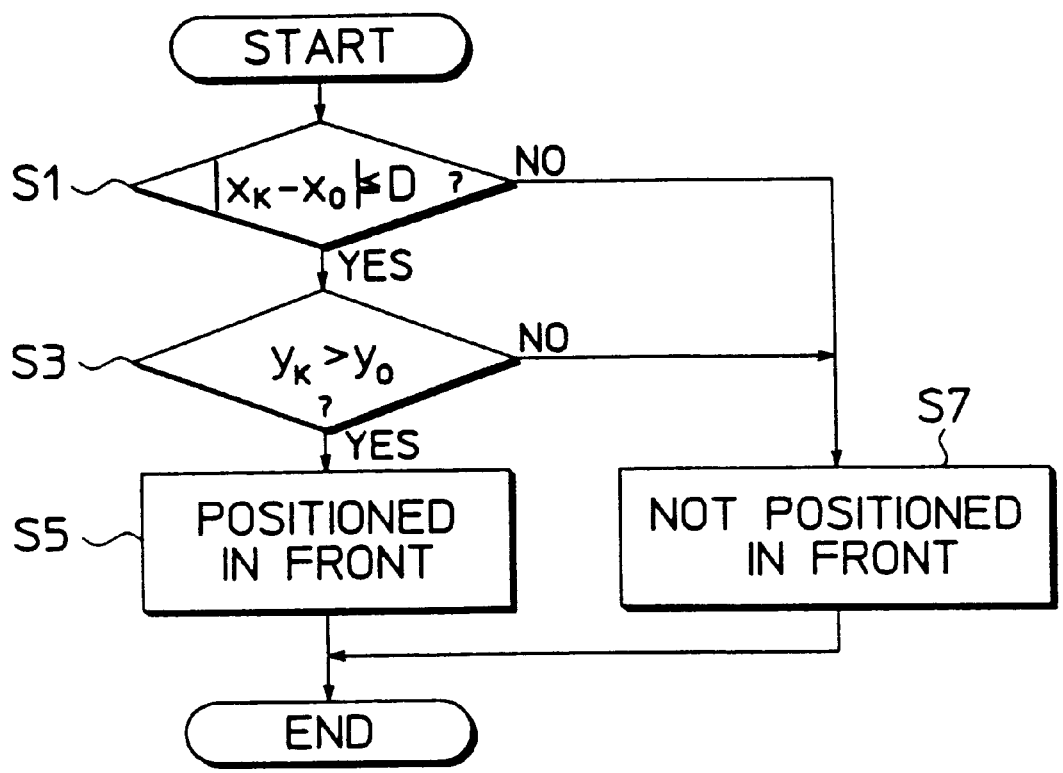
FIG. 6 is a flowchart of a sequence of making a movement decision.

The movement decision unit 258 determines whether the player's automobile or another general or rival automobile exists in front of a general automobile which is under consideration for a movement decision, according to a process shown in FIG. 6, using the positional relation determined between the player's automobile and the general and rival automobiles, the positional relation between the general automobiles, and the positional relation between the general and rival automobiles by the position decision unit 259. The results determined by the movement decision unit 258 are used by the general automobile control unit 257 to control the running of the general automobiles. If the movement decision unit 258 is arranged to determine whether there is an automobile in an adjacent lane or not, then it can determine whether an automobile under consideration can make a lane change or not.

The world coordinate system transformation unit 254 transforms the positional coordinate data of general and rival automobiles that are determined to be positioned in the visible range of the player's automobile by the position decision unit 259, from the course coordinate system (x, y) into the world coordinate system (X, Y, Z), according to a positional data transformation process, described later on, shown in FIG. 8.

The image display processor 256 displays the circuit road 52 (see FIG. 2) in the visible range of the player's automobile, the models of the buildings and other objects along the circuit road 52, and the general and rival automobiles whose positional coordinate data have been transformed into the world coordinate system (X, Y, Z), on the display monitor 2 according to known three-dimensional image processing techniques including geometry and rendering processes, depending on the position and direction of the player's automobile which is controlled by the player's automobile control unit 255. When a collision signal is supplied from the position decision unit 259, the image display processor 256 displays a spinning or vibrating image on the display monitor 2.

Inasmuch as the position decision unit 259 determines the positional relation between the player's automobile and the general and rival automobiles, the positional relation between the general automobiles, and the positional relation between the general and rival automobiles, and also determines general automobiles which are positioned in the visible range of the player's automobile in the two-dimensional course coordinate system (x, y), the position decision unit 259 can easily and quickly determine those positional relations and general automobiles positioned in the visible range of the player's automobile.

The general and rival automobiles are controlled by the course coordinate system processor 252, and the positional coordinate data of only those general and rival automobiles which are displayed on the display monitor 2 are transformed from the two-dimensional course coordinate system (x, y) into the three-dimensional world coordinate system (X, Y, Z). Therefore, the number of general automobiles that can be controlled can be increased without increasing the burden on the CPU of the controller 25. The increased number of general automobiles makes the driving game more interesting to the player, and also gives a more realistic look to three-dimensional images displayed on the display monitor 2.

The ranking decision unit 27 comprises a CPU, logic circuits, and other circuit elements for determining the rank of the player's automobile among the automobiles including the player's automobile and the rival automobiles after timeout or goal. The ranking decision unit 27 comprises a passing decision unit 271, a goal decision unit 273, a timer 275, and a point calculation unit 277.

The passing decision unit 271 determines whether the player's automobile passes or is passed by a general automobile, using the data transmitted from the position decision unit 259 as representing the positional relation between the player's automobile and the general automobiles, and also sends a collision signal from the position decision unit 259 to the point calculation unit 277.

The goal decision unit 273 determines whether the player's automobile and the rival automobiles have goaled or not using the data transmitted from the position decision unit 259 as representing the positional relation between the player's automobile and the general and rival automobiles and the positional relation between the general and rival automobiles. Determined results from the passing decision unit 271 and the goal decision unit 273 are used by the point calculation unit 277 to calculate technical points and determine ranking. The timer 275 starts measuring time from the start of the driving game and stops measuring time after elapse of a predetermined period of time, and sends a time measurement end signal to the point calculation unit 277.

The point calculation unit 277 has a ROM 277a which stores table data of Table 4 (described later on) and a RAM 277b. The point calculation unit 277 calculates technical points of the player's automobile, i.e., the player, using a passing/passed signal supplied from the passing decision unit 172 and a collision signal supplied from the position decision unit 259, and also calculates the rank of the player's automobile upon timeout or when all the player's automobile and the rival automobiles have goaled. A process of calculating technical points will be described later on. A ranking signal and other signals from the point calculation unit 277 are transmitted to the image display processor 256, and ranking is displayed on the display monitor 2 after timeout or after the player's automobile has reached the goal.

A process of making a movement decision with the movement decision unit 258 will be described below with reference to FIG. 6.

It is assumed that an automobile which is under consideration for a movement decision has coordinates ($x_o$, $y_o$) in the course coordinate system (x, y), an automobile k which is not under consideration for a movement decision have coordinates ($x_k$, $y_k$) in the course coordinate system (x, y), and each lane of the straight road 520 has a width D, where k is an integer ranging from 1~n, and that there are n automobiles which are not under consideration for a movement decision.

As shown in FIG. 6, the movement decision unit 258 determines whether or not the difference $x_k$–$x_o$ between the coordinates $x_k$, $x_o$ is equal to or smaller than the width D in a step S1. If the difference $x_k$–$x_o$ is equal to or smaller than the width D (YES in the step S1), then the movement decision unit 258 determines whether or not the coordinate $Y_k$ are greater than the coordinate $y_o$ in a step S3. If the coordinate y, are greater than the coordinate $y_o$ (YES in the step S3), then the movement decision unit 258 decides that the automobile k is positioned in front of the automobile which is under consideration for a movement decision in a step S5

If the difference $x_k$–$x_o$ is greater than the width D (NO in the step S1), then the automobile k is not positioned in the same lane as the automobile which is under consideration for a movement decision. If the coordinate $y_k$ are smaller than the coordinate $y_o$ (NO in the step S3), then the automobile k is not positioned in front of the automobile which is under consideration for a movement decision. In either case, the movement decision unit 258 decides that the automobile k is not positioned in front of the automobile which is under consideration for a movement decision in a step S7.

The above process is effected on other automobiles k (1~n) than the automobile which is under consideration for a movement decision, so that all automobiles positioned in front of the automobile which is under consideration for a movement decision can be ascertained.

Heretofore, the above process of making a movement decision is the most complex, and contains the largest number of processing steps, of all processes that make up the computerized control of the driving game. For driving an automobile on the display monitor 2 under preset conditions, it is necessary to determine whether another automobile exists on its preset path or not according to the above process of making a movement decision. If the positions of the automobiles were calculated using three-dimensional coordinate data and the positional relationship between the automobiles were determined and the above process of making a movement decision were carried out using the calculated positions for displaying a three-dimensional image, then the program of the driving game would be complex and contain a large number of processing steps.

However, according to the present invention, since the two-dimensional coordinate data in the course coordinate system are used by the movement decision unit 258, the above process of making a movement decision can be carried out easily as shown in FIG. 6. This allows many general automobiles, e.g., several tens of general automobiles, to be used in the driving game, making the driving game more fun to play than heretofore.

Operation of the driving game machine according to the present invention will be described below with reference to FIGS. 7 through 9.

Figure 7:
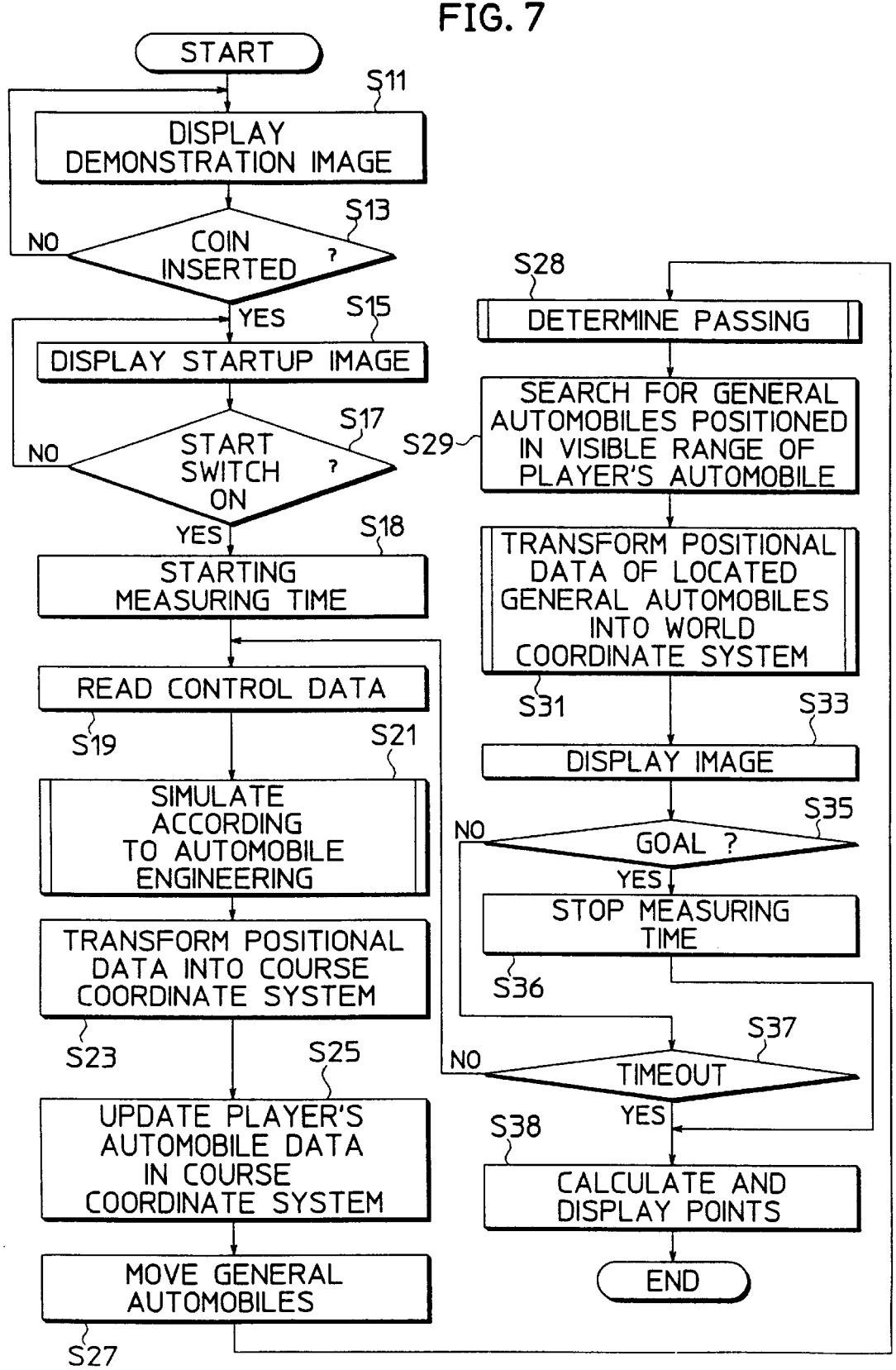
FIG. 7 is a flowchart of an operation sequence of the driving game machine.

As shown in FIG. 7, when the driving game machine is switched on, the image display processor 256 displays a demonstration image on the display monitor 2 in a step S11. Then, the controller 25 determines whether a coin is inserted into the coin insertion slot 8 or not in a step S13. If not inserted (NO in the step S13), then the image display processor 256 continuously displays the demonstration image on the display monitor 2. If inserted (YES in the step S13), then the image display processor 256 displays a startup image on the display monitor 2 in a step S15.

Then, the controller 25 determines whether the start switch 9 is pressed or not in a step S17. If not pressed (NO in the step 17), then the image display processor 256 continuously displays the startup image on the display monitor 2. If pressed (YES in the step S17), then the driving game is initiated, and the timer 275 starts measuring time in a step S18. The player now operates the steering wheel 4, the accelerator pedal 5, the brake pedal 6, and the gear change lever 7 of the driving control assembly 22 to drive the player's automobile.

Various control data outputted from the driving control assembly 22 are supplied to the player's automobile control unit 255 in a step S19. The player's automobile control unit 255 effects a simulation process of simulating the player's automobile based on the automobile engineering according to the automobile behavior program stored in the ROM 23 in a step S21. Positional coordinate data of the player's automobile are produced by the player's automobile control unit 255 in the simulation process, and supplied to the course coordinate system transformation unit 253, which transforms the positional coordinate data into positional coordinate data in the course coordinate system (x, y) in a step S23.

Then, the positional data of the player's automobile in the position decision unit 259 are updated in a step S25. The general automobile control unit 257 effects a process of moving the general and rival automobiles depending on the result, including the positional relation between the automobiles, determined by the movement decision unit 258 in a step S27. Then, the passing decision unit 271 determines whether the player's automobile passes or is passed by a general automobile according to a passing decision subroutine, described later on, in a step S28.

Thereafter, the position decision unit 259 ascertains general and rival automobiles that are positioned in the visible range of the player's automobile in a step S29. The world coordinate system transformation unit 254 transforms the positional coordinate data of the ascertained general and rival automobiles from the course coordinate system (x, y) into the world coordinate system (X, Y, Z) according to a positional data conversion subroutine, described later on, in a step S31.

Then, the image display processor 256 effects a three-dimensional image process on the positional coordinate data of the general and rival automobiles which have been converted into the world coordinate system (X, Y, Z) and also the data about the position and direction of the player's automobile which have been produced in the simulation process in the step 21, and displays the player's automobile and the general and rival automobiles on the display monitor 2 in a step S33. Then, the goal decision unit 273 determines whether the player's automobile has goaled or not in a step S35. If not goaled (NO in the step S35), then it is determined in a step S37 whether a time measurement end signal has been issued from the timer 275 or not, i.e., timeout has occurred or not.

If no timeout has occurred (No in the step S37), then control returns to the step S19 for thereby repeating the control of the running of the automobiles. If timeout has occurred (YES in the step S37), then the point calculation unit 277 calculates technical points of the player's automobile (=player) when it has reached the goal, and displays the rank and technical points of the player's automobile on the display monitor 2 in a step S39.

If goaled (YES in the step S35), then the timer 275 stops measuring time in a step S36. Then, the point calculation unit 277 calculates technical points of the player's automobile (=player) when it has reached the goal, and displays the rank and technical points of the player's automobile on the display monitor 2 in the step S39.

The technical points may be calculated and displayed in various ways. For example, points as the sum of:

(a) points in terms of the goal rank of the player's automobile+the remaining time (calculated by subtracting the time measured by the timer 275 from a predetermined time);

(b) points in terms of the number of general automobiles which the player's automobile has passed; and (c) technical points are calculated and displayed together with the rank of the player's automobile on the display monitor 2. If the total number of points is greater than a predetermined number of points, then the initials and name of the player are inputted, and the initials and name and the total points are stored in the RAM 24 and displayed in an idle time of the driving game machine on the display monitor 2.

Alternatively, the total number of points of each of ten players in upper ranks on the day of the game may be stored, and if the total number of points of the player is ranked among those of the ten players, then the initials and name of the player may be inputted, and the initials and name and the total points may be stored in the RAM 24 and may be displayed in an idle time of the driving game machine on the display monitor 2.

Figure 8:
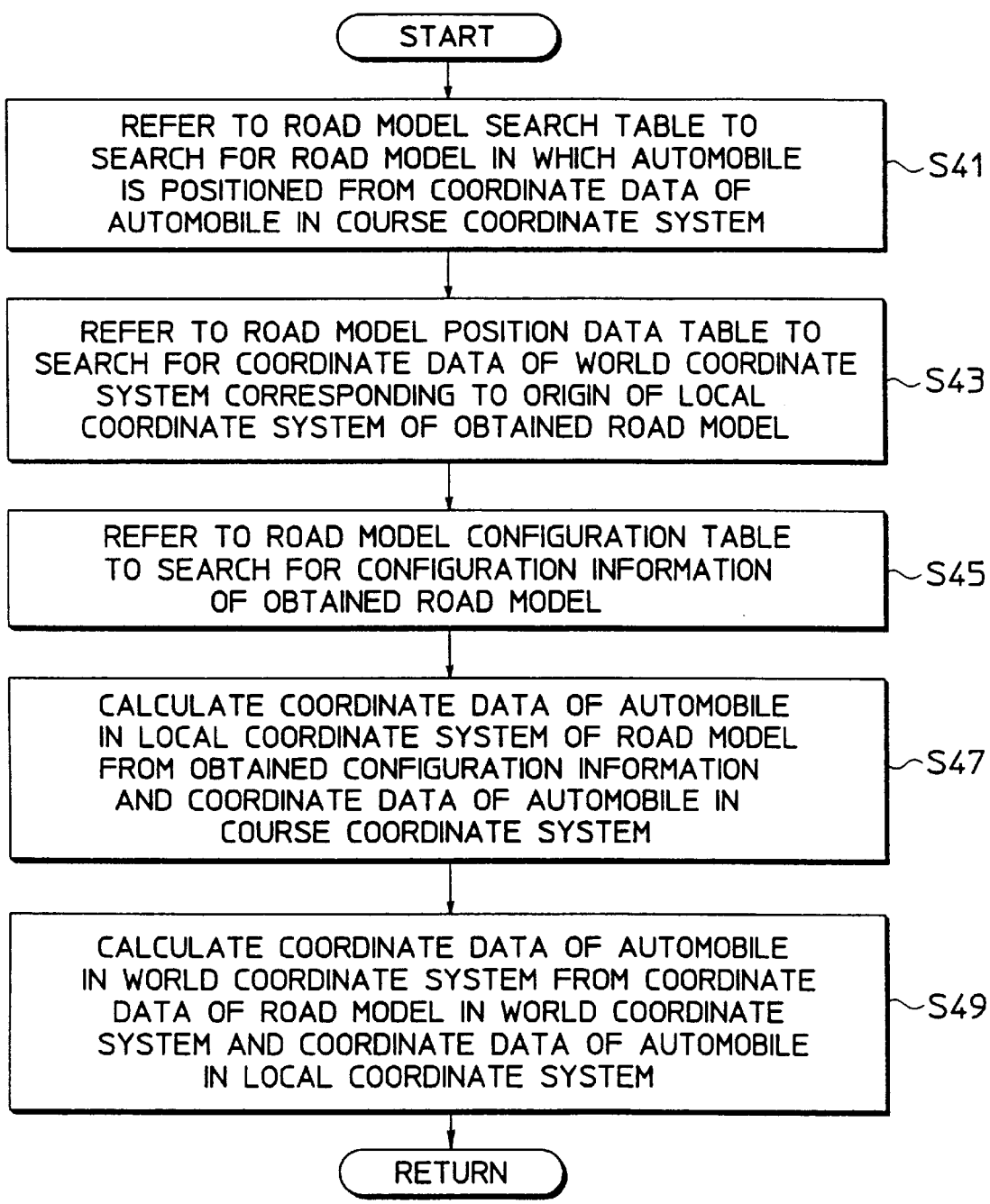
FIG. 8 is a flowchart of a conversion subroutine in the operation sequence shown in FIG. 7.
Figure 9:
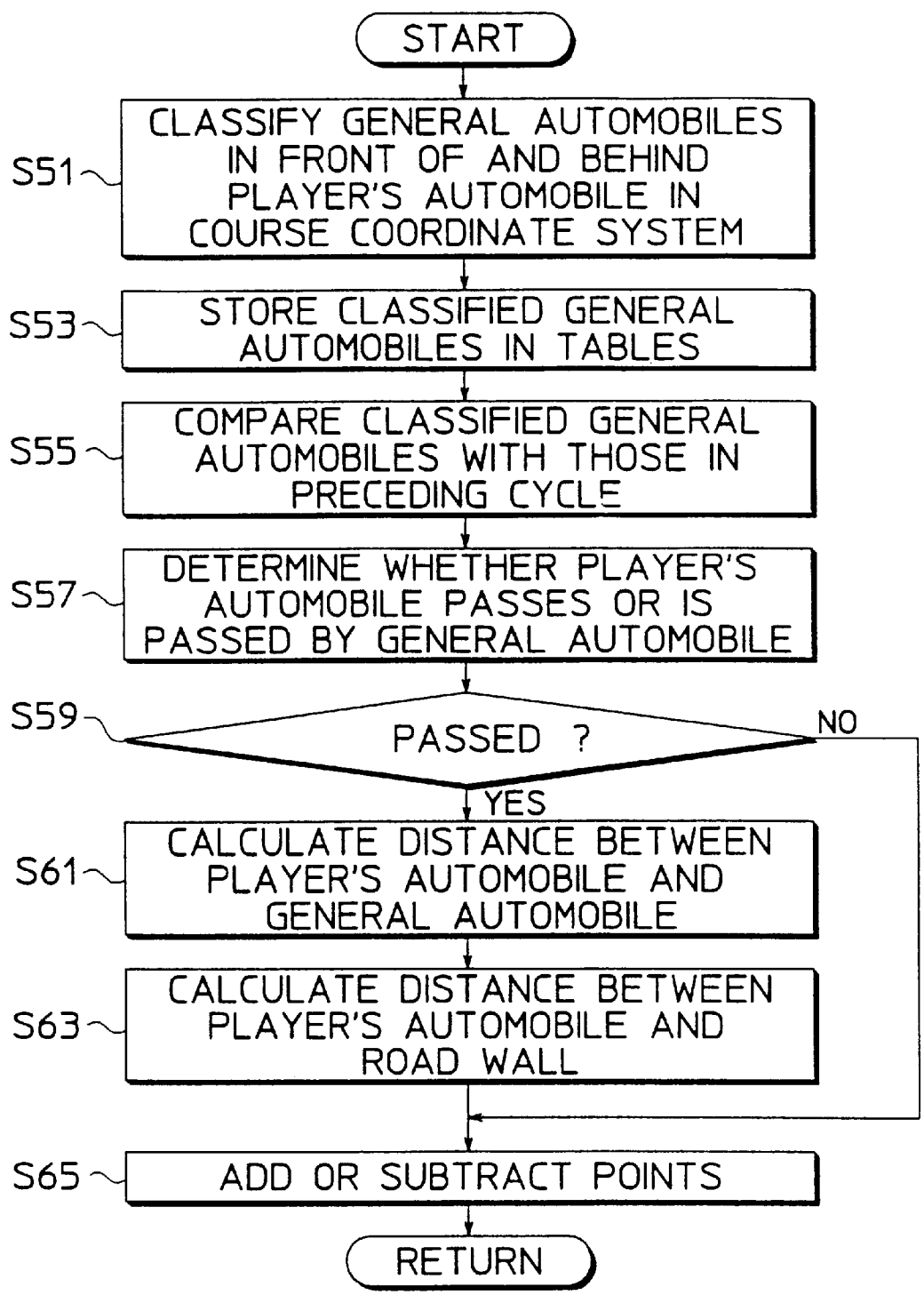
FIG. 9 is a further flow chart.

FIG. 8 shows the positional data transformation subroutine in the step S31 in greater detail.

First, as shown in FIG. 8, the world coordinate system transformation unit 254 refers to a road model search table 1, partly shown below, to search for a road model in which a general automobile is positioned, from the coordinate data of the general automobile in the course coordinate system (x, y) in a step S41,

TABLE 1

Road Model Search

| Distance (m) | Road model |
|---|---|
| 0 ~ 100 | ① |
| 100 ~ 150 | ② |
| 150 ~ 200 | ③ |
| 200 ~ 230 | ④ |
| 230 ~ 400 | ⑤ |
| 400 ~ 500 | ⑥ |
| . | . |
| . | . |
| . | . |

The road model search table 1, which is partly shown above, is stored in the ROM 23, and represents the association between the distance-related groups of the y coordinates of the straight road 520 in the course coordinate system (x, y) and the road models of the straight road 520.

Thereafter, in a step S43, the world coordinate system transformation unit 254 refers to a road model position data table 2, partly shown below, to search for coordinate data in the world coordinate system (X, Y, Z) which correspond to the origin of the local coordinate system (x, y, z) that describes the road model obtained in the step S41.

TABLE 2

Road Model Position Data

| Road Model | Position in world coordinate system |
|---|---|
| (1) | $(X_1, Y_1, Z_1)$ |
| (2) | $(X_2, Y_2, Z_2)$ |
| (3) | $(X_3, Y_3, Z_3)$ |
| (4) | $(X_4, Y_4, Z_4)$ |
| (5) | $(X_5, Y_5, Z_5)$ |
| (6) | $(X_6, Y_6, Z_6)$ |
| (7) | $(X_7, Y_7, Z_7)$ |
| (8) | $(X_8, Y_8, Z_8)$ |
| . | . |
| . | . |

The road model position data table 2, which is partly shown above, is stored in the ROM 23, and represents the positional relation between the local coordinate system (x, y, z) which describes the configuration information of each of the road models and the world coordinate system (X, Y, Z).

Then, in a step S45, the world coordinate system transformation unit 254 refers to a road model configuration table 3, partly shown below, to search for configuration information of the road model obtained in the step S41.

TABLE 3

Road Model Configuration

| | | Road Configuration Information | | |
|---|---|---|---|---|
| Road Model | Lanes | Shape | Center of Curvature | Radius of Curvature |
| ① | 4 | Straight | — | — |
| ② | 4 | Left Curve | $(x_2, y_2, z_2)$ | $r_2$ |
| ③ | 4 | Straight | — | — |
| ④ | 4 | Right Curve | $(x_4, y_4, z)$ | $r_4$ |
| ⑤ | 4 | Straight | — | — |
| ⑥ | 4 | Left curve | $(x_6, y_6, z_6)$ | $r_6$ |
| . | | . | . | |
| . | | . | . | |
| . | | . | . | |

The road model shape table 3, which is partly shown above, is stored in the ROM 23, and represents the information with respect to the configuration of each of the road models. The information with respect to the configuration of each of the road models includes the number of lanes, the shape, i.e., straight, left curve, or right curve, and additionally the center and radius of curvature for left and right curves in the local coordinate system (x, y, z).

Then, in a step S47, the world coordinate system transformation unit 254 calculates coordinate data of the automobile in the local coordinate system (x, y, z) of the road model from the coordinate data of the automobile in the course coordinate system (x, y) and the configuration information obtained in the step S45.

Finally, in a step S49, the world coordinate system transformation unit 254 calculates coordinate data of the automobile in the world coordinate system (X, Y, Z) from the coordinate data of the road model in the world coordinate system (X, Y, Z), which have been obtained in the step S43, and the coordinate data of the automobile in the local coordinate system (x, y, z), which have been obtained in the step S47.

In the subroutine shown in FIG. 8 for the coordinate transformation from the course coordinate system (x, y), automobiles that run in inner lanes along a curve of the circuit board 12 may be somewhat decelerated, and automobiles that run in outer lanes along a curve of the circuit board 12 may be somewhat accelerated for thereby compensating for automobile speed differences between the straight road 520 and the circuit road 52.

Figure 3:
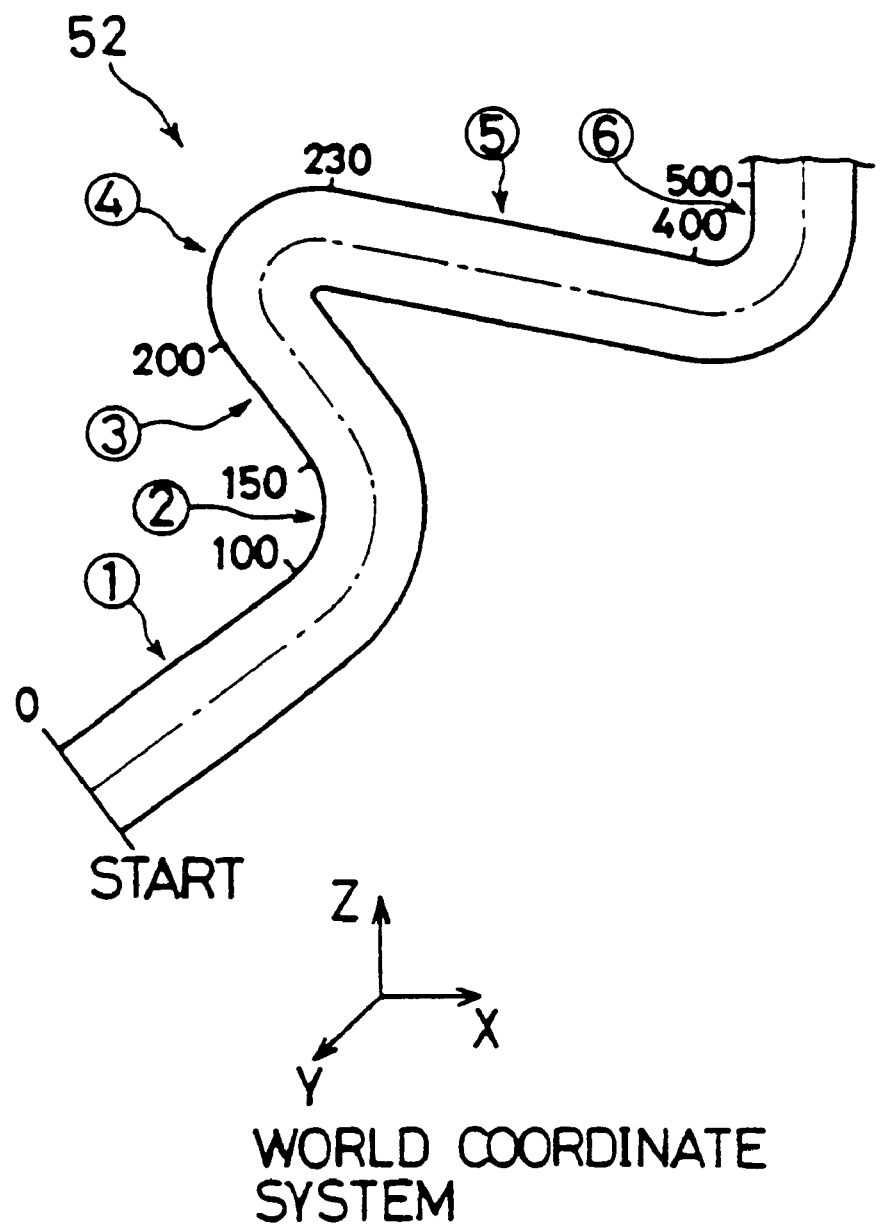
FIG. 3 is a diagram showing a portion of a circuit road which is divided into road models.

In FIG. 3, the circuit road 52 may be divided into road models of uniform length at constant distances or intervals. The road models of uniform length can easily be searched for in the step S41 shown in FIG. 8.

The passing decision subroutine carried out in the step S28 will be described below with reference to FIG. 9. The passing decision subroutine is executed by the passing decision unit 271 and the point calculation unit 277.

The passing decision unit 271 compares the y coordinates of all the general automobiles and the y coordinate of the player's automobile in the course coordinate system (x, y) to classify all the general automobiles into those general automobiles which are present in front of the player's automobile and those general automobiles which are present behind the player's automobile in a step S51. Then, the passing decision unit 271 stores the codes of those general automobiles which are present in front of the player's automobile in a temporary front automobile table in the RAM 24 and also stores the codes of those general automobiles which are present behind the player's automobile in a temporary rear automobile table in the RAM 24 in a step S53. The y coordinates of the general and player's automobiles may be the y coordinates of the central positions of the general and player's automobiles.

Thereafter, the passing decision unit 271 compares the codes which were stored in the front and rear automobile tables in the step S53 in the preceding cycle, i.e., the codes which were stored at the last time, with the codes which have been stored in the front and rear automobile tables in the step S53 in the present cycle in a step S55. The passing decision unit 271 searches for any general automobile which is classified in different tables between the preceding and present cycles, i.e., any general automobile which was present behind the player's automobile in the preceding cycle, but is present in front of the player's automobile in the present cycle (in this case, the player's automobile has been passed by the general automobile), or any general automobile which was present in front of the player's automobile in the preceding cycle, but is present behind the player's automobile in the present cycle (in this case, the player's automobile has passed the general automobile), thereby extracting any general automobile which has passed the player's automobile or has been passed by the player's automobile in a step S57.

If there is no general automobile which the player's automobile has passed in a step S59 (NO), then control jumps to a step S65. If there is a general automobile which the player's automobile has passed in the step S59 (YES), then the passing decision unit 271 calculates the distance between the player's automobile and the general automobile that has passed the player's automobile using the data of the positional relation between the player's and general automobiles from the position decision unit 259 in a step S61. In this embodiment, the distance in the x-coordinate direction in the course coordinate system (x, y) is calculated as the distance between the player's automobile and the general automobile that has passed the player's automobile. Then, the passing decision unit 271 calculates the distance between the player's automobile and a road boundary (displayed as a wall image of the road) using the data of the positional relation between the player's automobile and the road boundary from the position decision unit 259 in a step S63.

Thereafter, the point calculation unit 277 refers to a point table 4, shown below, and adds or subtracts technical points based on the point table 4, using the result obtained in the step S57 and other results in the step S65.

TABLE 4

| Point |
|---|

| 1. Technical points to be added | |
|---|---|
| Passed a general automobile while skidding | +1 |
| Distance up to a general automobile along x-axis was within 4 m | +1 |
| Distance up to a general automobile along x-axis was within 2 m | +2 |
| Passed a large-size automobile | +1 |
| Passed a general automobile along a curve | +1 |
| Distance up to a wall was within 2 m | +1 |
| Distance up to a wall was within 1 m | +1 |
| 2. Technical points to be subtracted | |
| Passed by a general automobile | −1 |
| Collided with a general automobile | −2 |
| Collided with a wall | −3 |

The player's automobile control unit 255 determines whether the player's automobile has skidded or not. Therefore, the point calculation unit 277 can calculate technical points based on skidding of the player's automobile when it is supplied with a skid signal from the player's automobile control unit 255. The point calculation unit 277 can calculate technical points for passing a general automobile along a curve based on coordinate transformations carried out by the world coordinate system transformation unit 254.

Two players can compete with each other in a driving game which is played using two driving game machines each identical to the driving game machine shown in FIG. 5.

The two driving game machines are connected to each other by a communication cable. To allow the two driving game machines to communicate with each other, the controller 25 of each of the driving game machines additionally has a communication control unit 26 shown in FIG. 5.

The communication control unit 26 in the controller 25 of one of the driving game machines transmits the coordinate data of the position of the player's automobile to the other driving game machine, and receives the player's automobile controlled by the other driving game machine, i.e., the coordinate data in the course coordinate system (x, y) of the rival automobile controlled by the other driving game machine, and sends the received coordinate data to the position decision unit 259.

The communication control units 26 in the controllers 25 of the two driving game machines exchange the positional data of the player's automobiles controlled by the respective driving game machines. Therefore, the players of the two driving game machines can compete with each other in a driving game jointly played on the driving game machines, and will find the driving game much more interesting.

Because the positional data of the rival automobile are handled as the two-dimensional coordinate data in the course coordinate system (x, y), the position decision unit 259 can easily and quickly determine the positional relations and the rival automobile in the visible range of the player's automobile. If three or more driving game machines are interconnected, the number of rival automobiles is increased, making the driving game much more interesting to the participating players.

The communication control unit 26 may transmit the positional coordinate data of the player's automobile in the world coordinate system (X, Y, Z) which have been obtained by the player's automobile control unit 255, and also receive the positional coordinate data of the player's automobile in the world coordinate system (X, Y, Z) which is controlled by another driving game machine. In such a modification, the course coordinate system transformation unit 253 transforms the received positional coordinate data into the course coordinate system (x, y), and then delivers the transformed positional coordinate data to the position decision unit 259.

The interconnected driving game machines may be dispensed with their own individual controllers 25, but may be controlled by a single controller 25 in a centralized control system that governs all the driving game machines. In this modified arrangement, the single controller 25 does not need any communication control unit 26, but has world coordinate system processors 251 associated respectively with the driving game machines. The single controller 25 also has the course coordinate system processor 252, the course coordinate system transformation unit 253, and the world coordinate system transformation unit 254 for carrying out the same decision and transformation processes as described above.

In the illustrated embodiment, technical points are added or subtracted depending on the driving skill or technique of the player with which the player's automobile has passed or has been passed by a general automobile. However, technical points may be added or subtracted depending on the driving skill or technique of the player with which the player's automobile has passed or has been passed by a rival automobile. If the driving game machine controls the movement of rival automobiles, then the driving game can be more fun to play by controlling the movement of rival automobiles in a manner to interfere with the player's automobile. In this case, however, since it frequently happens for the player's automobile to pass and to be passed by rival automobiles, adding or subtracting technical points based on the player's automobile having passed or having been passed by a rival automobile is less effective and attractive. This also holds true when the movement of rival automobiles is controlled by the player of another connected driving game machine. For the above reason, according to the illustrated embodiment, technical points are added or subtracted when the player's automobile has passed or has been passed by a general automobile, not a rival automobile, with the consequence that technical points are calculated solely based on the driving skill or technique of the player. Accordingly, the player finds the driving game highly interesting as it accurately reflects the player's driving skill or technique.

Technical points may be calculated based on parameters other than those shown in the point table 4 described above. For example, technical points may be calculated without taking into account the distance between the player's automobile and a general automobile or the distance between the player's automobile and a wall, or may be calculated taking into account a parameter such as the difference in speed between the player's automobile and a general automobile which has been passed by the player's automobile, or whether the player's automobile has passed a general automobile on its right side or left side.

In the illustrated embodiment, the player's automobile is finally ranked based on the total points calculated by adding the goal rank of the player's automobile and technical points. However, the player's automobile may be finally ranked based on technical points only or a total of technical points and the number of general automobiles which the player's automobile has passed.

In addition, parameters used to rank each of the players are not limited to the technical points, but may be any parameters insofar as they can reflect the skill of each or the players. For example, additional parameters may be represented by the highest speed in the driving race and the fastest lap time, i.e., the shortest time required to finish one circuit run, if the course is a circuit course.

With the arrangement of the present invention, the player's automobile is ranked using parameters relative to the skill or technique of the player who controls the player's automobile. Therefore, the skill or technique of the player is evaluated in various ways and reflected in the rank of the player's automobile. Accordingly, the player finds the driving game machine highly interesting and much fun to play.

The player's automobile is ranked based on the driving skill of the player capable of passing other automobiles. Therefore, the player can concentrate on not only efforts to run fast around the course, but also attempts to pass other automobiles.

The player's automobile is also ranked based on the distance between the player's automobile and another automobile which has been passed by the player's automobile. The player is thus required to pay attention to the distance between the player's automobile and the other automobile. This also makes the driving game on the driving game machine interesting.

Similarly, the player's automobile is further ranked based on the distance between the player's automobile and a road boundary or wall when the player's automobile passes another automobile. The player is thus required to pay attention to the distance between the player's automobile and the road boundary when the player's automobile passes the other automobile.

Furthermore, the player's automobile is ranked based on the number of automobiles which the player's automobile has passed. AS a result, the player naturally makes efforts to pass as many automobiles as possible during the driving game, and finds the driving game exciting.

Since the value of a parameter used with respect to the player's automobile to evaluate the driving skill of the player capable of passing one of other controlled automobiles is variable, the driving game machine is further interesting to the player.

Although a certain preferred embodiment of the present invention has been shown and described in detail, it should be understood that various changes and modifications may be made therein without departing from the scope of the appended claims.

What is claimed is:

1. A competition game apparatus for operation by a player, comprising:

image display processing means for displaying a real-time image including a course established in a game space, a player's movable object movable with respect to the course, and a plurality of other movable objects movable with respect to the course on a display monitor;

driving control means for instructing the player's movable object to run on the course in response to actuation by the player;

player's movable object control means for controlling the player's movable object to run on the course in response to instructions from said driving control means; and ranking means for ranking the player's movable object based a parameter indicative of skill of the player while the player's movable object is running on the course, said ranking means including:

passing detecting means for detecting whether said player's movable object passes or is passed by one of said other movable objects and producing a passing signal in response thereto; and parameter varying means for varying a value of the parameter based on the passing signal from said passing detecting means.

2. The competition game apparatus according to claim 1 wherein said parameter varying means includes a ROM for storing a data table including a plurality of parameters and corresponding values.

3. The competition game apparatus according to claim 2, wherein said plurality of parameters include a determination that the player's movable object is passed by said one of said other movable objects and a corresponding one of said corresponding values is negative.

4. The competition game apparatus according to claim 2, wherein said plurality of parameters include a determination that the player's movable object passed said one of said other movable objects and a corresponding one of said corresponding values is positive.

5. A competition game apparatus for operation by a player, comprising:

image display processing means for displaying a real-time image including a course established in a game space, a player's movable object movable with respect to the course, and a plurality of other movable objects movable with respect to the course on a display monitor;

driving control means for instructing the player's movable object to run on the course in response to actuation by the player;

player's movable object control means for controlling the player's movable object to run on the course in response to instructions from said driving control means; and ranking means for ranking the player's movable object using a parameter indicative of skill of the player while the player's movable object is running on the course, said ranking means including:

passing detecting means for detecting whether said player's movable object passes or is passed by one of said other movable objects and producing a passing signal in response thereto, said passing detecting means including first distance calculating means for calculating a distance between said player's movable object and said one of said other movable objects when said passing signal is outputted from said passing detecting means; and parameter varying means for varying a value of the parameter based on the passing signal from said passing detecting means, and said parameter varying means including means for varying the value of the parameter based on said distance calculated by said first distance calculating means.

6. The competition game apparatus according to claim 5, wherein said course has a predetermined width defined by course boundaries, and wherein said passing detecting means comprises second distance calculating means for calculating a distance between said player's movable object and one of said course boundaries when said passing signal is outputted from said passing detecting means, and said parameter varying means comprises means for varying the value of the parameter based on said distance calculated by said second distance calculating means.

7. The competition game apparatus according to claim 6, wherein said value of said parameter corresponding to the distance calculated by the second distance calculating means is increases the distance calculated by the second distance calculating means decreases.

8. The competition game apparatus according to claim 6, wherein said parameter varying means comprises means for varying the value of the parameter based on a number of times that said passing signal is outputted from said passing detecting means.

9. The competition game apparatus according to claim 8, wherein said other movable objects include at least one controlled movable object, and wherein:

said passing detecting means detects whether said player's movable object passes or is passed by said controlled movable objects and sends a second passing signal in response thereto; and said parameter varying means varies the value of the parameter based on said second passing signal from said passing detecting means.

10. The competition game apparatus according to claim 5, wherein said parameter varying means comprises means for varying the value of the parameter based on a number of times that said passing signal is outputted from said passing detecting means.

11. The competition game apparatus according to claim 10, wherein said other movable objects include at least one controlled movable object, and wherein:

said passing detecting means detects whether said player's movable object passes or is passed by said controlled movable objects and sends a second passing signal in response thereto; and said parameter varying means varies the value of the parameter based on said second passing signal from said passing detecting means.

12. The competition game apparatus according to claim 5, wherein said other movable objects include at least one controlled movable object, and wherein:

said passing detecting means detects whether said player's movable object passes or is passed by said controlled movable objects and sends a second passing signal in response thereto; and said parameter varying means varies the value of the parameter based on said second passing signal from said passing detecting means.

13. A competition game apparatus for operation by a player, comprising:

image display processing means for displaying a real-time image including a course established in a game space, a player's movable object movable with respect to the course, and a plurality of other movable objects movable with respect to the course on a display monitor;

driving control means for instructing the player's movable object to run on the course in response to actuation by the player;

player's movable object control means for controlling the player's movable object to run on the course in response to instructions from said driving control means; and ranking means for ranking the player's control of said player's movable object by assigning ranking points based on at least one event indicative of skill of the player while the player's movable object is running on the course, said ranking means including:

passing detecting means for detecting whether said player's movable object passes or is passed by one of said other movable objects and producing a passing signal in response thereto wherein passing is one of said events; and ranking points varying means for varying a value of the ranking points for the player based on the passing signal from said passing detecting means.

14. A competition game apparatus for operation by a player, comprising:

image display processing means for displaying a real-time image including a course established in a game space, a player's movable object movable with respect to the course, and a plurality of other movable objects movable with respect to the course on a display monitor;

driving control means for instructing the player's movable object to run on the course in response to actuation by the player;

player's movable object control means for controlling the player's movable object to run on the course in response to instructions from said driving control means;

ranking means for ranking the player's control of said player's movable object by assigning ranking points based events indicative of skill of the player while the player's movable object is running on the course, said ranking means including:

passing detecting means for detecting whether said player's movable object passes or is passed by one of said other movable objects and producing a passing signal in response thereto wherein passing is one of said events, said passing detecting means including first distance calculating means for calculating a distance between said player's movable object and said one of said other movable objects when said passing signal is outputted from said passing detecting means; and ranking points varying means for varying a value of the ranking points for the player based on the passing signal from said passing detecting means, and said ranking points varying means including means for varying the value of the ranking points based on said distance calculated by said first distance calculating means.

15. The competition game apparatus according to claim 14, wherein said ranking points varying means comprises means for varying the value of the ranking points based on a number of times that said passing signal is outputted from said passing detecting means.

16. The competition game apparatus according to claim 14, wherein said value of said ranking points is increased a greater amount the lesser the distance calculated by the distance calculating means is.

17. The competition game apparatus according to claim 14, wherein said course has a predetermined width defined by course boundaries, and wherein said passing detecting means comprises second distance calculating means for calculating a distance between said player's movable object and one of said course boundaries when said passing signal is outputted from said passing detecting means, and said ranking points varying means comprises means for varying the value of the ranking points based on said distance calculated by said second distance calculating means.

18. The competition game apparatus according to claim 17, wherein said value of said ranking points is increased a greater amount the lesser the second distance calculated by the second distance calculating means is.

19. The competition game apparatus according to claim 17, wherein said ranking points varying means comprises means for varying the value of the ranking points based on a number of times that said passing signal is outputted from said passing detecting means.

20. The competition game apparatus according to claim 14 wherein said ranking points varying means includes a ROM for storing a data table including a plurality of said events and corresponding values.

21. The competition game apparatus according to claim 20, wherein said plurality of events includes a determination that the player's movable object is passed by said one of said other movable objects and a corresponding one of said corresponding values is negative.

22. The competition game apparatus according to claim 20, wherein said plurality of events includes a determination that the player's movable object passed said one of said other movable objects and a corresponding one of said corresponding values is positive.

* * * * *